United States Patent
Krasnov

(10) Patent No.: US 11,966,462 B2
(45) Date of Patent: Apr. 23, 2024

(54) MALICIOUS DEPENDENCY PREVENTION

(71) Applicant: Dropbox, Inc., San Francisco, CA (US)

(72) Inventor: Aleksandr Krasnov, Richmond, KY (US)

(73) Assignee: Dropbox, Inc., San Francisco, CA (US)

( * ) Notice: Subject to any disclaimer, the term of this patent is extended or adjusted under 35 U.S.C. 154(b) by 295 days.

(21) Appl. No.: 17/449,327

(22) Filed: Sep. 29, 2021

(65) Prior Publication Data

US 2023/0094735 A1   Mar. 30, 2023

(51) Int. Cl.
*G06F 21/53* (2013.01)
*G06F 9/455* (2018.01)
*H04L 9/32* (2006.01)
*H04L 9/40* (2022.01)

(52) U.S. Cl.
CPC .............. *G06F 21/53* (2013.01); *G06F 9/455* (2013.01); *H04L 9/3236* (2013.01); *H04L 63/166* (2013.01); *G06F 2221/033* (2013.01); *G06F 2221/2115* (2013.01)

(58) Field of Classification Search
CPC .......... G06F 21/50; G06F 21/51; G06F 21/52; G06F 21/53; G06F 21/55; G06F 21/56; G06F 21/57; G06F 9/455; G06F 2221/033; G06F 2221/2115; H04L 9/3236; H04L 63/166
See application file for complete search history.

(56) References Cited

U.S. PATENT DOCUMENTS

| | | | |
|---|---|---|---|
| 5,651,111 A | 7/1997 | McKeeman et al. | |
| 7,565,533 B2 | 7/2009 | Scheifler et al. | |
| 7,711,775 B2 | 5/2010 | Tavis et al. | |
| 7,836,440 B2 | 11/2010 | Blackman et al. | |
| 8,656,482 B1* | 2/2014 | Tosa .................... | G06F 9/45558 713/153 |
| 9,536,079 B2 | 1/2017 | Chen et al. | |
| 9,547,478 B1 | 1/2017 | Hale | |
| 9,996,566 B2 | 6/2018 | Ben-Aharon et al. | |
| 10,380,337 B2 | 8/2019 | Langton et al. | |
| 10,382,196 B2 | 8/2019 | Shields et al. | |
| 2007/0060394 A1 | 3/2007 | Gowin et al. | |

(Continued)

Primary Examiner — Malcolm Cribbs
(74) Attorney, Agent, or Firm — DLA PIPER LLP

(57) ABSTRACT

A computing system identifies a third-party dependency to be added to a codebase. The third-party dependency is hosted on a third-party server. The computing system downloads the third-party dependency within a secure runtime environment. The computing system generates a signature value for the third-party dependency. The computing system compares the signature value to a database of signature values of approved third-party dependencies. Upon determining that the signature value does not correspond to any signature values of the approved third-party dependencies, the computing system executes the third-party dependency within the secure runtime environment. The computing system monitors the execution of the third-party dependency within the secure runtime environment to identify suspicious activity. Upon determining that the third-party dependency is not exhibiting suspicious activity, the computing system adds the signature value to the database of signature values of approved third-party dependencies.

16 Claims, 8 Drawing Sheets

(56) References Cited

U.S. PATENT DOCUMENTS

| | | | |
|---|---|---|---|
| 2011/0214176 A1* | 9/2011 | Burch | G06F 9/45533 718/1 |
| 2014/0033304 A1* | 1/2014 | Lewis | G06F 21/53 726/22 |
| 2016/0162685 A1* | 6/2016 | Feroz | G06F 9/45558 726/22 |
| 2016/0294794 A1 | 10/2016 | Mancic et al. | |
| 2017/0300311 A1* | 10/2017 | Vasquez Lopez | G06F 8/63 |
| 2018/0196654 A1* | 7/2018 | Bo | G06F 8/60 |
| 2018/0247055 A1* | 8/2018 | Curtis | G06F 21/554 |

* cited by examiner

MALICIOUS DEPENDENCY PREVENTION

TECHNICAL FIELD

The present disclosure relates to security systems and methods, and more particularly, it relates to preventing malicious dependencies from entering a codebase.

BACKGROUND

Codebases for an organization's service are typically maintained by a team of developers. In addition to internally developed dependencies, a developer may also use various third-party dependencies that may be developed by developers that are not associated with the organization. While developers typically rely on third-party dependencies that may be well known and used, not all third-party dependencies are created equal. For example, a third-party dependency may be infected with malware, such that, when incorporated into an organization's code base, may infect servers and systems associated with that organization.

SUMMARY

In some embodiments, a method is disclosed herein. A third-party dependency to be added to a codebase may be identified. The third-party dependency may be hosted on a third-party server. The third-party dependency may be downloaded within a secure runtime environment. A signature value for the third-party dependency may be generated. The signature value may be compared to a database of signature values of approved third-party dependencies. In some embodiments, upon determining that the signature value does not correspond to any signature values of the approved third-party dependencies, the third-party dependency with a replica of the codebase may be executed within the secure runtime environment. Execution of the third-party dependency within the secure runtime environment may be monitored to identify whether the third-party dependency violates a security rule. In some embodiments, upon determining that the third-party dependency does not violate the security rule, the signature value may be added to the database of signature values of approved third-party dependencies.

In some embodiments, a method is disclosed herein. A virtualization element may be identified for use with a codebase. The virtualization image corresponding to the virtualization element may be downloaded within a secure runtime environment. The virtualization image may be hashed to generate a hash value for the virtualization image. The hash value may be compared to a database of approved virtualization images. In some embodiments, upon determining that the hash value does not correspond to any of the approved virtualization images, the virtualization element may be provisioned within the secure runtime environment using the virtualization image. Behavior of the virtualization element within the secure runtime environment may be monitored to identify suspicious activity. In some embodiments, upon determining that virtualization element is not exhibiting suspicious activity, to developer may be allowed to utilize the virtualization image with the codebase.

In some embodiments, a non-transitory computer readable medium is disclosed herein. The non-transitory computer readable medium includes one or more sequences of instructions, which, when executed by one or more processors, causes a computing system to perform operations. The operations may include identifying, by the computing system, a third-party dependency. The third-party dependency may be hosted on a third-party server. The operations may further include executing, by the computing system, the third-party dependency within a secure runtime environment. The operations may further include monitoring, by the computing system, the execution of the third-party dependency within the secure runtime environment to identify suspicious activity. The operations may further include, upon determining, by the computing system, that the third-party dependency is not exhibiting suspicious activity, generating a signature value for the third party dependency and adding the signature value to a database of signature values of approved third-party dependencies.

BRIEF DESCRIPTION OF THE DRAWINGS

The above-recited and other advantages and features of the disclosure will become apparent by reference to specific embodiments thereof, which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings.

DETAILED DESCRIPTION

Figure 1:
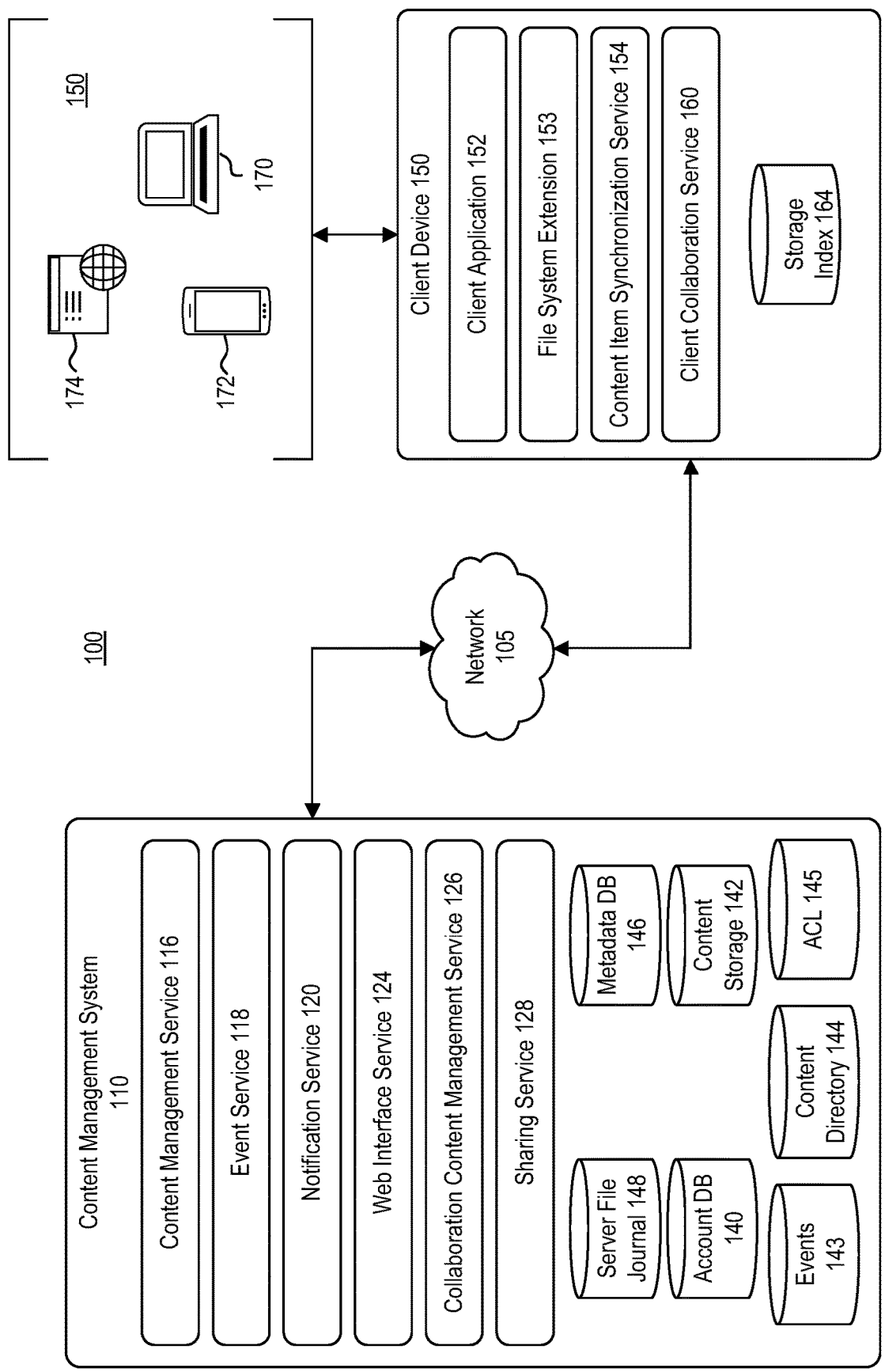
FIG. 1 illustrates an example system configuration of a content management system and client devices, according to example embodiments.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The one or more techniques disclosed herein are generally directed to a system and method for monitoring use of third-party dependencies in a codebase. Generally, a dependency may be representative of a function, a library, a file, a folder, or any other content item containing a piece of code that some other code within the codebase utilizes or "depends on." When developers import third-party dependencies into a codebase, they may accidentally import the wrong dependency or a compromised dependency. For example, the developer may mistype the dependency name when entering an import statement. Because typographical errors are bound to occur, fraudulent individuals have found ways to exploit this by generating third-party dependencies that are named very similar to actual dependencies, in hopes that the developer will mistype the dependency in the import statement. In another example, the developer may wish to import an internal (e.g., proprietary) dependency, but the build tool used to find and import requested dependencies may instead import an external dependency (e.g., a publicly available third-party dependency) by the same name, for example, if such external dependency happens to exist and if the tool is configured to prioritize external dependencies. This scenario can also be exploited by fraudulent individuals who can find out (or guess) the name of an internal dependency within the organization and publish an external dependency by the same name. These types of scenarios may be referred to as "dependency confusion" and may involve attackers infiltrating a developer's system by injecting their malicious code into the organization's codebases.

To account for these and other types of vulnerabilities, one or more techniques provided herein implement a dependency monitoring system. The dependency monitoring system may include a database of approved dependencies and a secure runtime environment. When a developer attempts to import or use a third-party dependency, the dependency monitoring system may include a handler or agent that runs a tiered security check on the dependency. First, the dependency monitoring system may create a unique signature (e.g., hash) the dependency and compare the dependency against the database of approved dependencies. If the dependency monitoring system finds a match, then it may determine that the dependency has been approved and the developer is free to use the dependency. If, however, the system does not find a match, the system may execute the dependency in a secure runtime environment. Within the secure runtime environment, the system may monitor behavior of the dependency to identify any anomalies or malicious calls outside of the expected perimeter. If no anomalies or malicious calls are identified, the system may hash the dependency and add it to the database of approved dependencies. In some embodiments, the system may continue to monitor the dependency as it is used in the codebase once deployed in a runtime server. For example, the system continue to monitor the dependency in real-time to determine how the dependency acts within the codebase once deployed.

Similar techniques may be extended to virtualization images (e.g., container images or virtual machine images) to ensure that the virtualization element has not been compromised.

FIG. 1 is a block diagram illustrating a configuration of system 100, according to example embodiments. System 100 may include a content management system 110 interacting with a client device 150.

Content management system 110 may include one or more components. For example, as illustrated, content management system 110 may include content management service 116, event service 118, notification service 120, web interface service 124, collaboration content management service 126, and sharing service 128. In some embodiments, content management system 110 may further include one or more storage items. Such storage items may include, but are not limited to, server file journal 148, account database 140, events 143, content directory 144, access control list (ACL) 145, content storage 142, and metadata database 146.

Content management system 110 may communicate with client device 150 via network 105. Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in system 100 to send and receiving information between the components of system 100.

Client device 150 may include one or more components. For example, as illustrated, client device 150 may include client application 152, content item synchronization service 154, file system extension 153, and client collaboration service 160. In some embodiments, client device 150 may further include one or more storage components. As illustrated, client device 150 may include storage index 164.

Accounts

Content management system 110 can store content items in association with accounts, as well as perform a variety of content item management tasks, such as retrieve, modify, browse, and/or share the content item(s) (e.g., collaboration documents). Furthermore, content management system 110 can enable an account to access collaboration document(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of collaboration documents while an engineering group can have access to another set of collaboration documents. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, messages, etc. A content item can also include collections or other mechanisms for grouping content items together with different behaviors, such as folders, zip files, playlists, albums, etc. A collection can refer to a folder, or a plurality of content items that are related or grouped by a common attribute. Content items can also include hyperlinks, shortcuts or placeholder files storing metadata identifying other content items, such as other content items stored on content management system 110 or on a third-party content management system. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users. Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 can be a computing device having a local file system accessible by multiple applications resident thereon. Client device 172 can be a computing device wherein content items are only accessible to a specific application or by permission given by the specific application, and the content items are stored either in an application specific space or in the cloud. Client device 174 can be any client device accessing content management system 110 via a web browser and accessing content items via a web interface. While example client devices 170, 172, and 174 are depicted in form fusers such as a laptop, mobile device, or web browser, it should be understood that the descriptions thereof are not limited to devices of these example form fusers. For example, a mobile device such as client device 172 might have a local file system accessible by multiple applications resident thereon, or client device 172 might access content management system 110 via a web browser. As such, the form fuser should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 154.

Content item synchronization service 154 can be in communication with content management service 116 to synchronize changes to content items between client device 150 and content management system 110.

Client device 150 can synchronize content with content management system 110 via content item synchronization service 154. The synchronization can be platform agnostic. That is, content can be synchronized across multiple client devices of varying type, capabilities, operating systems, etc. Content item synchronization service 154 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 153 (which can be integrated with the local file system, or even the operating system kernel) can intercept read, write, copy, move, delete, add, modify, etc. commands relative to content items in the designated location of the file system of client device 150.

When file system extension 153 notices a write, move, copy, or delete command, it can notify content item synchronization service 154, which can synchronize the changes to content management system service 116. In some embodiments, content item synchronization service 154 can perform some functions of content management system service 116 including functions addressed above such as dividing the content item into blocks, hashing the content item to generate a unique identifier, etc. Content item synchronization service 154 can index content within storage index 164 and save the result in storage index 164. Indexing can include creating a unique identifier for each content item. In some embodiments, content item synchronization service 154 creates this unique identifier by putting the data of the content item (e.g., excluding the filename and/or other metadata) through a hash function; as addressed above, content management system can use a similar process to provide identifiers to content on content management system 110.

Content item synchronization service 154 can use storage index 164 to facilitate the synchronization of at least a portion of the content within client storage with content associated with a user account on content management system 110. For example, content item synchronization service 154 can compare storage index 164 with content management system 110 and detect differences between content on client storage and content associated with a user account on content management system 110. Content item synchronization service 154 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 120. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 154 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification.

Sometimes client device 150 might not have a network connection available. In this scenario, content item synchronization service 154 can monitor the linked collection for content item changes and queue those changes for later synchronization to content management system 110 when a network connection is available. Similarly, a user can manually start, stop, pause, or resume synchronization with content management system 110.

Content item synchronization service 154 can synchronize content associated with a particular user account on content management system 110. Alternatively, content item synchronization service 154 can selectively synchronize a portion of the content of the total content associated with the particular user account on content management system 110. Selectively synchronizing only a portion of the content can preserve space on client device 150 and save bandwidth.

In some embodiments, content item synchronization service 154 selectively stores a portion of the content associated with the particular user account and stores placeholder content items in client storage for the remainder portion of the content. For example, content item synchronization service 154 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 154 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user with whom a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 120 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. In addition, in some embodiments, some portions or components of content management system 110 described herein may be included in or integrated with one or more client devices 150. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
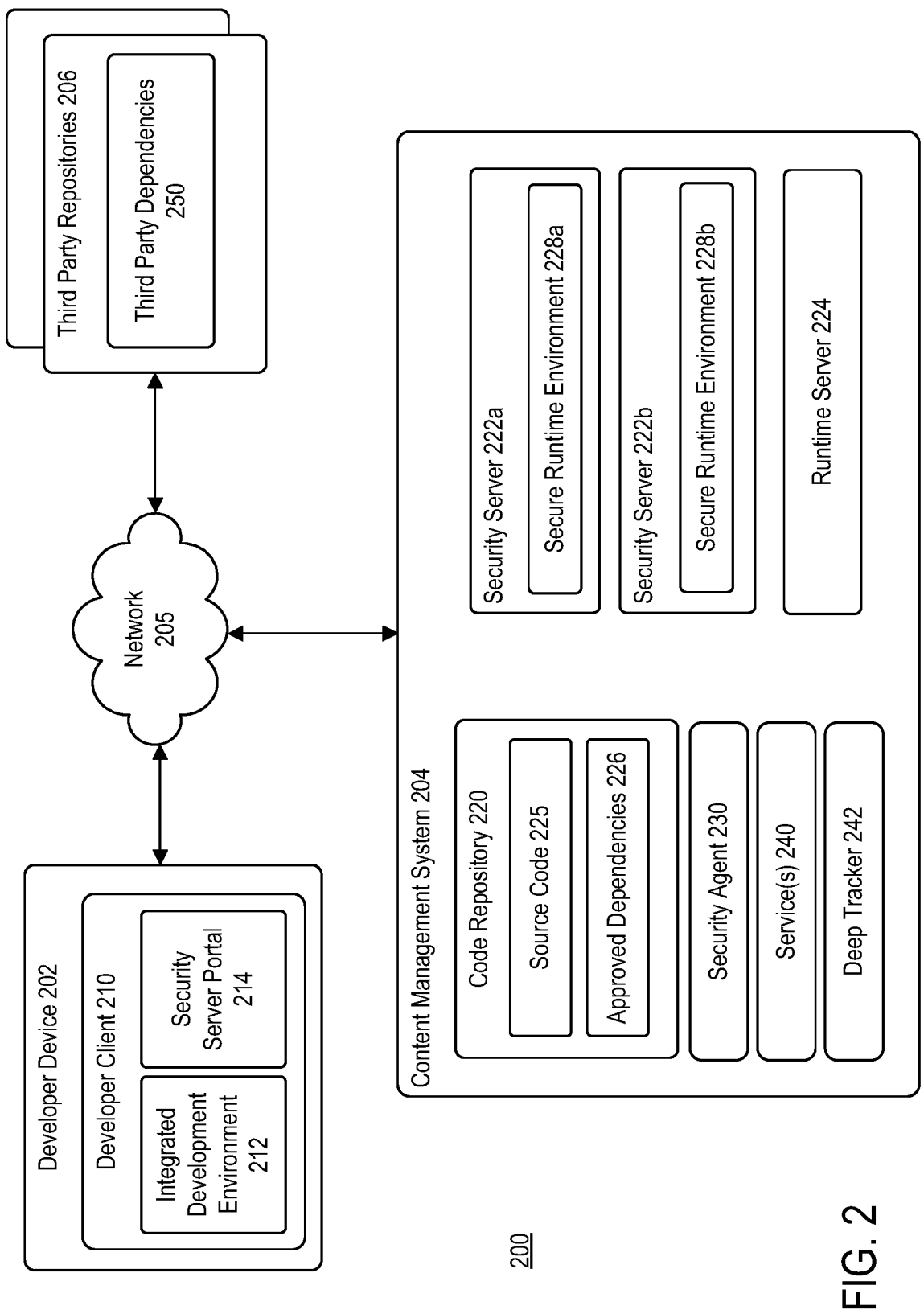
FIG. 2 illustrates an example system configuration of the content management system and client devices of FIG. 1, according to example embodiments.

FIG. 2 is a block diagram of an example system 200, according to example embodiments. For example, system 200 may correspond to system 100 described above. As illustrated, system 200 may include developer device 202, content management system 204, and third-party repositories 206 communicating via network 205 (similar to network 105).

A user of developer device 202 may be associated with content management system 110. For example, a user of developer device 202 may be representative of an engineer or developer of an entity associated with content management system 204. In this manner, user of developer device 202 may have access to a codebase or code repository 202 associated with content management system 204. As shown, developer device 202 may include a developer client 210. Developer client 210 may be representative of an application through which a developer may modify or add programming code to code repository 220 of content management system 204.

Developer client 210 may include integrated development environment 212 and security server portal 214. Integrated development environment 212 may be representative of an application that allows a developer or computer programmer to develop computer programs for an entity associated with content management system 204. For example, integrated development environment 212 may include a source code editor, build automation tools, and/or a debugger tool. In this manner, a developer or computer programmer can develop applications or services for use with content management system 204.

In some embodiments, a computer programmer or developer may seek to integrate a third-party dependency in their programming code. For example, a computer programmer or developer may wish to utilize an external dependency developed and/or hosted by one or more third-party repositories 206. To utilize a third-party dependency, the computer programmer or developer may download a third-party dependency (e.g., third party dependencies 250) from an associated third-party repository 206. Once downloaded, the computer programmer or developer may import the dependency, with all of its sub-dependencies, into integrated development environment 212.

It is important to note, however, that the computer programmer or developer may not simply rely on third-party libraries or third-party dependencies alone. For example, in some embodiments, the computer programmer or developer may utilize one or more internal dependencies or internal libraries into their programming code. In some embodiments, the computer programmer or developer may perform a similar series of operations by downloading and importing the internal dependency.

As described above, when a computer programmer or developer relies on external or internal libraries in their programming code, the computer programmer or developer may open content management system 204 to potential vulnerabilities. In some embodiments, the third-party dependency may include malware that could infect content management system 204. In some embodiments, the computer programmer or developer may attempt to utilize an internal dependency, only to mistype the name of the dependency. In such situations, a fraudulent individual may develop a dependency that is close in name to the desired internal dependency. In this manner, rather than importing the internal dependency, because of the typographical error, the computer programmer or developer may instead be calling an infected dependency from a third-party repository 206.

To account for this, developer client 210 includes security server portal 214. Security server portal 214 may allow a computer programmer or developer to access security server 222a and security server 222b of content management system 204. For example, instead of downloading and calling a dependency directly within integrated development environment 212, the computer programmer or developer may download and execute the dependency in a secure sandboxed environment.

In this manner, a computer programmer or developer may scan the dependency before incorporating the dependency in code repository 220. Such functionality may reduce or eliminate the potential for a malicious dependency to infect code repository 220 of content management system 204.

Developer device 202 may be in communication with content management system 204. Content management system 204 may be representative of a plurality of computing systems configured to host content accessible by developer device 202 and one or more end users (e.g., subscribers, customers, etc.). As shown, content management system 204 may include code repository 220, security server 222a, security server 222b, security agent 230, and runtime server 224.

Security server 222a and security server 222b may work in conjunction to provide a developer or computer programmer with a secure environment to test or scan dependencies or libraries before incorporation into code repository 220. As shown, security server 222a may include secure runtime environment 228a. Secure runtime environment 228a may be representative of a sandboxed environment, in which a developer or computer programmer may execute the codebase stored in code repository 220. During execution, secure runtime environment 228a may generate metadata that captures the actions of the codebase during execution. Exemplary types of metadata may include, but are not limited to, infrastructure calls, application calls, networking calls, and the like. In some embodiments, infrastructure calls may correspond to operations or actions that affect or make changes to infrastructure of infrastructure as a code (IaaC) tools. In some embodiments, application calls may include cross-application scripting, SQL server reporting services (SSRS) vulnerabilities, any application security (AppSec) calls, and the like. In some embodiments, networking calls may correspond to calls to internal connections, public connections, private connections, external connections, and the like.

Security server 222b may include secure runtime environment 228b. Secure runtime environment 228b may be representative of a sandboxed environment, in which a developer or computer programmer may download and test a dependency. The developer or computer programmer may execute a replica of the codebase, with the downloaded dependency, in secure runtime environment 228b. In this manner, by executing a replica of the code base with the downloaded dependency in secure runtime environment 228b, secure runtime environment 228b may protect content management system 204 from potential malicious code that may be associated with a dependency. In operation, a user may utilize security server portal 214 to download and import a dependency into secure runtime environment 228b for monitoring. During execution, secure runtime environment 228b may generate metadata that captures the various actions of the codebase during execution.

Security agent 230 may be configured to determine whether the dependency is malicious based on the metadata generated by secure runtime environment 228a and the metadata generated by secure runtime environment 228b. For example, security agent 230 may compare the calls captured in the metadata generated by secure runtime environment 228b to the calls captured in the metadata generated by secure runtime environment 228a to identify a subset of calls unique to the metadata generated by secure runtime environment 228b.

Once the subset of calls unique to the metadata generated by secure runtime environment 228b is identified, security agent 230 may analyze the subset of calls to identify whether any anomalies occurred. Because the metadata captures each call that is made, security agent 230 is able to identify those methods or functions that triggered a security alert. Generally, execution in secure runtime environment 228a and secure runtime environment 228b may be subject to various security rules. For example, secure runtime environment 228a and secure runtime environment 228b may implement a whitelist of allowed actions. In this manner, during execution in secure runtime environment 228a and during execution in secure runtime environment 228b, only those actions permitted in the whitelist may occur. Security agent 230 may analyze the subset of calls to identify anomalous activity. Anomalous activity may be representative of violations of the security rules, i.e., those actions not permitted in the whitelist of permitted actions.

In some embodiments, the anomalies may be representative of three types of anomalies: infrastructure anomalies, application anomalies, and networking anomalies.

Infrastructure anomalies (e.g., anomalies detected in infrastructure calls) may correspond to a set of violations or malicious actions that target IaC tools, such as, but not limited to CHEF™, Puppet, Ansible®, SALT, and the like. For example, assume CHEF™ is running the production. There may be a library called "chef_maybe_malicious" that is automating the deployment using CHEF™. The library may attempt to run chef enumeration, disallowed actions, and the like. An attacker may run the library in a way that may allow for better reconnaissance (e.g., enumeration of CHEF™ services), privilege escalation (e.g., running services that are not allowed or accessing data that is private), and persistence (e.g., installing CHEF™ agents that allow for a better persistence and later remote control of the system). In another example, Ansible® may be used to deploy changes to the production. Each time there is a change to the product, Ansible® may use a yaml file highlighting steps on what to do to perform changes, build the product, and deploy it. Deployment destination may vary based on inventory file. An attack may compile an Ansible® dependency that may alternate the file in such a way that it may deploy changes to the product as well as sending metadata (and any other sensitive data) to a remote server. Thus, an attacker can gather sensitive information to later destroy the product or system based on the data collected.

Application anomalies (e.g., anomalies detected in application calls) may correspond to application security vulnerabilities. For example, assume a product is running on React®. There is a dependency called "react_debug_maybe_malicious" that may help engineers to debug any React errors. An attacker may compile a dependency in a way that the dependency may trigger XSS to steal customer's data and later send it to a remote server. In another example, a product may use PHP for backend processes. There is a dependency called "php_highlight_maybe_malicious" that may assist engineers to highlight PHP code errors. An attacker may compile a dependency in such a way that the dependency may exploit insecure deserialization to perform remote code execution, privilege escalation, arbitrary file access, and denial of service attack.

Networking anomalies (e.g., anomalies detected in networking calls) may correspond to callbacks made to a remote sever or private server. For example, a networking engineer may use a program to perform networking segregation. The engineer may use "segregation_maybe_malicious" dependency. An attacker may have crafted this dependency in such a way that any secure connection made to the network may be decrypted so that the attacker may be performing a man-in-the-middle attack. In another example, a library may be used to monitor any denial-of-service (DoS) attack that may be identified by a security service (e.g., Amazon Web Services® (AWS) security service) called "aws_security_maybe_malicious." An attacker may have created this dependency in such a way that it may obfuscate alerts to AWS, thus allowing DoS attacks to exist undetected. In this manner, an attacker may bring down the entire business before the business realizes that services went down.

If security agent 230 analyzes the subset of actions and identifies anomalies or malicious calls outside of the expected perimeter, security agent 230 may alert developer device 202 that the dependency contains malicious code.

If, however, security agent 230 does not identify any anomalies or malicious calls outside of the expected perimeter, security agent 230 may alert developer device 202 that the dependency does not contain malicious code. In some embodiments, security agent 230 may further hash the dependency and store the dependency in code repository 220. In this manner, when a computer programmer or developer accesses security server portal 214 to test a dependency, security agent 230 may first hash the dependency and compare the hashed dependency against those approved dependencies 226 stored in code repository 220.

Once approved, security agent 230 may append the metadata generated by security server 222b to security server 222a. Security agent 230 may further shift the codebase to runtime server 224 for deployment. As shown, runtime server 224 may be representative of a server configured to deploy a service 240 corresponding to a portion of source code 225. In this manner, service 240 executing in runtime server 224 may be accessible by end users.

Code repository 220 may be configured to store the code base for content management system 204. For example, code repository 220 may be representative of a database that may store all programming code associated with applications and/or services associated with content management system 204. As shown, code repository 220 may include source code 225 and approved dependencies 226. Source code 225 may correspond to that source code or programming code that defines or makes up the codebase associated with content management system 204. Via integrated development environment 212, a developer or computer programmer may add to or modify source code 225.

Approved dependencies 226 may include a copy of a dependency that was scanned and approved by security agent 230. In some embodiments, approved dependencies 226 may include a hash table. The hash table may include a listing of approved dependencies with their corresponding hashed representation. In this manner, when a computer programmer or developer submits dependency for a security check, security agent 230 may first hash the dependency and compare the dependency against approved dependencies 226. If security agent 230 finds a match, then security agent 230 may determine that the dependency has been monitored and approved.

Additionally, in some embodiments, developer client 210 may utilize those dependencies in approved dependencies 226 rather than calling the dependency from a third-party repository 206. In other words, by hashing and storing approved dependencies 226 in code repository 220, a computer programmer or developer may have the option to call the dependency directly from code repository 220.

In some embodiments, content management system 204 may further include services 240 and a deep tracker 242. Services 240 may be representative of one or more services or applications associated with content management system 204. Each service 240 may be associated with a respective portion of source code 225 stored in code repository 220. In some embodiments, source code 225 corresponding to a service 240 may include an approved dependency 226. Although the dependency may have been approved by security agent 230, there may be situations in which malicious tendencies may not reveal themselves in the initial security scan. In such situations, content management system 204 may utilize deep tracker 242 to monitor a service 240 deployed in runtime server 224.

Deep tracker 242 may be configured to run security checks on service 240 once deployed in runtime server 224. For example, deep tracker 242 may be configured to monitor execution of service 240 in runtime server 224 and identify any anomalies that may be triggered by the execution. For example, deep tracker 242 may monitor the source code for various system calls (e.g., application calls, infrastructure calls, network calls, etc.), authenticity of calls between services, and the like to see if service 240 is exhibiting anomalous activity. Such deep tracking provides a further check on third party dependencies, by monitoring the behavior of the third party dependency once deployed. Such analysis may be useful, for example, in a continuous integration/continuous deployment pipeline between deployment and integration phases.

Figure 3:
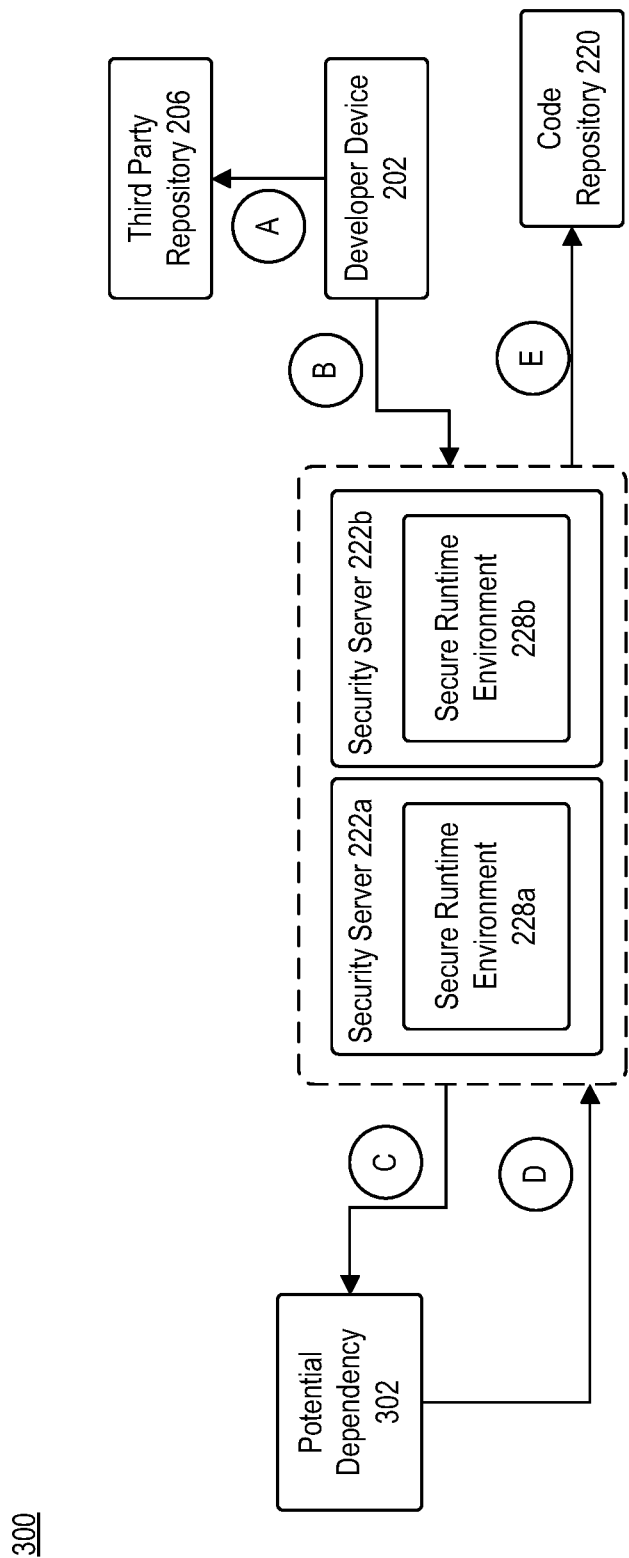
FIG. 3 is a block diagram illustrating communication among components of the system of FIG. 2, according to example embodiments.

FIG. 3 is a block diagram 300 illustrating communication among components of system 200, according to example embodiments. As shown, developer device 202 identifies a potential dependency 302 for inclusion in code repository 220 (Step A). In some embodiments, such as that shown in FIG. 3, potential dependency 302 may be a third-party dependency hosted by third-party repository 206. In some embodiments, potential dependency 302 may be an internal dependency (or at least thought to be an internal dependency).

Developer device 202 may instruct security server 222*b* to download a potential dependency 302 in secure runtime environment 228*b* (Step B). For example, developer device 202 may access security server 222*b* using security server portal 214. Using security server portal 214, a developer may download or pull a dependency from third-party repository 206. In some embodiments, downloading or pulling a dependency from third-party repository 206 may include accessing a uniform resource locator (URL) corresponding to the dependency in integrated development environment 212. Once downloaded, security server 222*b* may call the dependency. For example: pip install numpy.

Security agent 230 may check potential dependency 302 to see if security agent 230 has already scanned and approved potential dependency 302 (Step C). For example, security agent 230 may generate a hash value corresponding to potential dependency 302. Security agent 230 may then query code repository 220 to determine whether there is a stored matching hash value. If security agent 230 determines there is a stored matching hash value, then security agent 230 may conclude that it has already analyzed and approved potential dependency 302. If, however, security agent 230 determines that there is not a stored matching hash value, then security agent 230 may perform additional steps to clear potential dependency 302.

Security agent 230 may execute potential dependency 302 in secure runtime environment 228*b* to determine whether potential dependency 302 exhibits any malicious behavior (Step C). For example, security server 222*b* may execute a replica of the codebase with potential dependency 302 in secure runtime environment 228*b*. Security server 222*a* may execute the codebase without the dependency in secure runtime environment 228*a*. Security agent 230 may compare metadata generated by security server 222*b* to metadata generated by security server 222*a* to identify any anomalies or malicious calls outside of the expected perimeter. As provided above, because the metadata can capture substantially every call that is being made, security agent 230 may easily identify which method or function violated a security rule. If security agent 230 identifies anomalies or malicious calls outside of the expected perimeter, security agent 230 may alert developer device 202 that the dependency contains malicious code.

If, however, security agent 230 does not identify anomalies or malicious calls, then security agent 230 may add potential dependency 302 to code repository 220 with the corresponding hash value (Step D). In this manner, potential dependency 302 may be called as an internal dependency by a developer.

Figure 4:
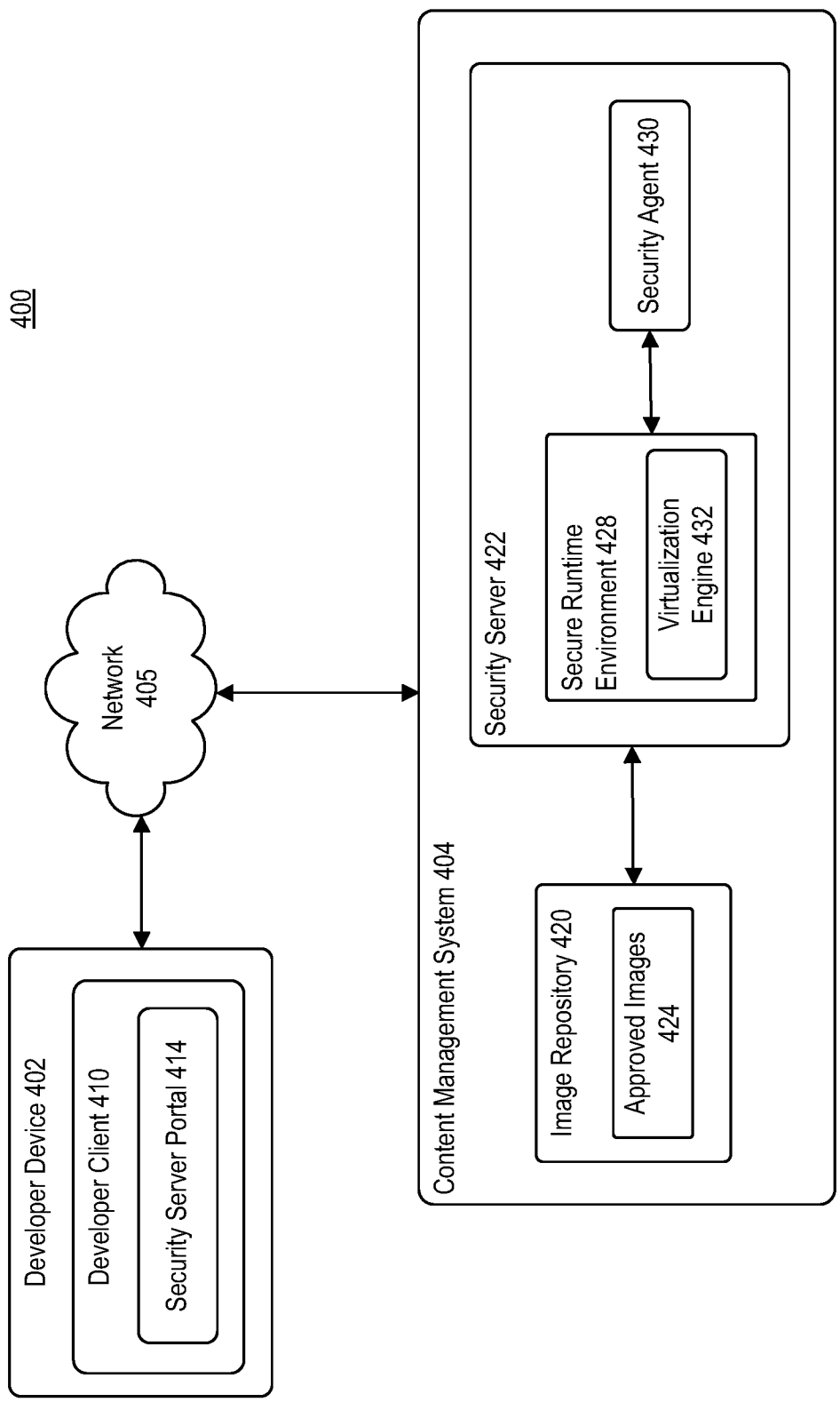
FIG. 4 illustrates an example system configuration of the content management system and client devices of FIG. 1, according to example embodiments.

FIG. 4 is a block diagram of an example system 400, according to example embodiments. For example, system 400 may correspond to system 100 described above. As illustrated, system 400 may include developer device 402 and content management system 404 communicating via network 405 (similar to network 105).

A user of developer device 402 may be associated with content management system 110. For example, a user of developer device 402 may be representative of an engineer or developer of an entity associated with content management system 404. In this manner, user of developer device 402 may have access to a codebase or code repository associated with content management system 404. As shown, developer device 402 may include a developer client 410. Developer client 410 may be representative of an application through which a developer may provision one or more virtualization elements in content management system 404. A virtualization element may include a hardware-level virtualization element, such as a virtual machine, or an operation system (OS)-level virtualization element, such as a container.

Developer client 410 may include security server portal 414. While virtualization elements may provide developers and organizations with agility and flexibility for scaling their platform, without proper maintenance, such virtualization elements can pose security risks. In conventional systems, virtualization element forensic is typically a post hoc analysis, i.e., the analysis occurs after a problem occurs. Sever portal 414 allows a developer to perform virtualization element forensic as an a priori analysis, i.e., the analysis occurs before a problem has an opportunity to occur.

Security server portal 414 may allow a computer programmer or developer to access security server 422 of content management system 404. For example, instead of provisioning a virtualization element directly within content management system 404 using a virtualization image, the computer programmer or developer may download the virtualization image and provision the virtualization element using the virtualization image a secure sandboxed environment. In this manner, a computer programmer or developer may scan the container image before it is incorporated into image repository 420. Such functionality may reduce or eliminate the potential for malicious code in the virtualization image to infect content management system 404.

Developer device 402 may be in communication with content management system 404. Content management system 404 may be representative of a plurality of computing systems configured to host content accessible by developer device 402 and one or more end users (e.g., subscribers, customers, etc.). As shown, content management system 404 may include image repository 420, security server 422, and security agent 430.

Security server 422 may be configured to provide a developer or computer programmer with a secure environment to test or scan a virtualization image before incorporation into image repository 420. As shown, security server 422 may include secure runtime environment 428. Secure runtime environment 428 may be representative of a sandboxed environment, in which a developer or computer programmer may download and test a virtualization image. For example, secure runtime environment 428 may protect content management system 404 from potential malicious code that may be associated with the virtualization image. In operation, a user may utilize security server portal 414 to download and a virtualization image and import the virtualization image into secure runtime environment 428 for monitoring. Secure runtime environment 428 may include a virtualization engine 432 configured to provision a virtualization element using the virtualization image.

Security agent 430 may be configured to monitor behavior of the virtualization element once provisioned within secure runtime environment 428. Security agent 430 may implement a whitelist that includes a pre-selected list of allowed actions a virtualization element provisioned using a potential image may take. For example, the whitelist may define those calls (e.g., system calls, application calls, networking calls, etc.) that the virtualization element may take. Security server 422 may generate a set of metadata based on the execution. Security agent 430 may parse the metadata to identify any anomalies or malicious calls that violate the security rules defined in the whitelist. If security agent 430 identifies anomalies or malicious calls outside of the expected perimeter, security agent 430 may alert developer device 402 that the virtualization image is corrupted or contains malicious code.

If, however, security agent 430 does not identify any anomalies or malicious calls outside of the expected perimeter, security agent 430 may alert developer device 402 that the virtualization image does not contain malicious code. In some embodiments, security agent 430 may further hash the virtualization image and store the virtualization image in image repository 420. In this manner, when a computer programmer or developer accesses security server portal 414 to test a virtualization image, security agent 430 may first hash the virtualization image and compare the hashed virtualization image against approved images 424 stored in image repository 420.

Image repository 420 may be configured to store virtualization images used by content management system 404. Image repository 420 may include approved images 424. Approved images 424 may include a copy of a virtualization image that was scanned and approved by security agent 430. In some embodiments, approved images 424 may include a hash table. Hash table may include a listing of approved virtualization images with their corresponding hashed representation. In this manner, when a computer programmer or developer submits a virtualization image for a security check, security agent 430 may first hash the virtualization image and compare the virtualization image against approved images 424. If security agent 430 finds a match, then security agent 430 may determine that the virtualization image has been analyzed and approved.

Figure 5:
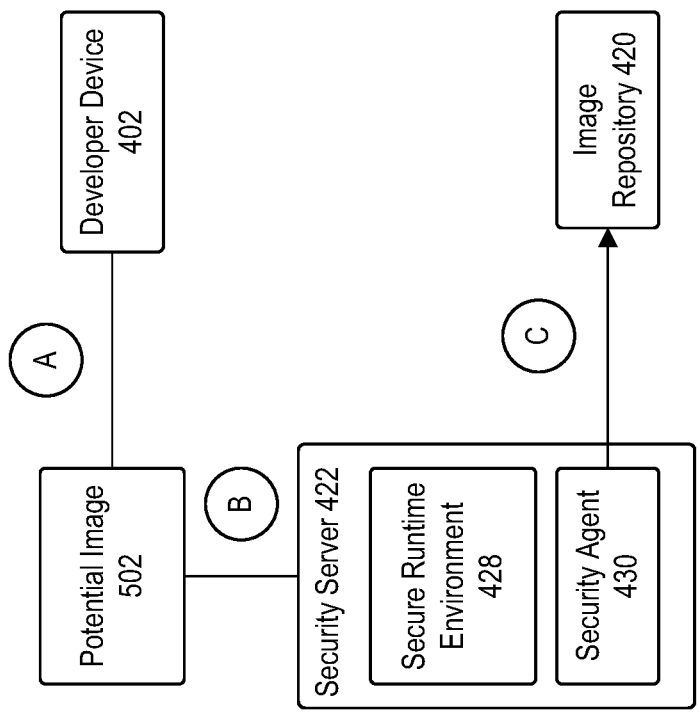
FIG. 5 is a block diagram illustrating communication among components of the system of FIG. 4, according to example embodiments.

FIG. 5 is a block diagram 500 illustrating communication among components of system 400, according to example embodiments. As shown, developer device 402 identify a potential image 502 for inclusion in image repository 420.

Developer device 402 may instruct security server 422 to download a potential image 502 in secure runtime environment 428 (Step A). For example, developer device 402 may access security server 422 using security server portal 414. Using security server portal 414, a developer may upload potential image 502.

Security agent 430 may check potential image 502 to see if security agent 430 has already scanned and approved potential image 502 (Step B). For example, security agent 430 may generate a hash value corresponding to potential image 502. Security agent 430 may then query image repository 420 to determine whether there is a stored matching hash value. If security agent 430 determines there is a stored matching hash value, then security agent 430 may conclude that it has already analyzed and approved potential image 502. If, however, security agent 430 determines that there is not a stored matching hash value, then security agent 430 may perform additional steps to clear potential image 502.

Security agent 430 may provision a virtualization element using potential image 502 in secure runtime environment 428 to determine whether potential image 502 exhibits any malicious behavior (Step C). For example, security agent 430 may monitor the behavior of potential image 502 to identify any anomalies or malicious calls outside of the expected perimeter. Security agent 430 may implement a whitelist that includes a pre-selected list of allowed actions the provisioned virtualization element (using potential image 502) may take. For example, the whitelist may define those calls (e.g., system calls, application calls, networking calls, etc.) that the provisioned virtualization element may take. Security server 422 may generate a set of metadata based on the execution. Security agent 430 may parse the metadata to identify any anomalies or malicious calls that violate the security rules defined in the whitelist. If security agent 430 identifies anomalies or malicious calls outside of the expected perimeter, security agent 430 may alert developer device 402 that potential image 502 contains malicious code.

If, however, security agent 430 does not identify anomalies or malicious calls, then security agent 230 may add potential image 502 in image repository 420 with the corresponding hash value. In this manner, security agent 430 may take an a priori approach to analyzing a virtualization image before any issues present themselves.

Figure 6:
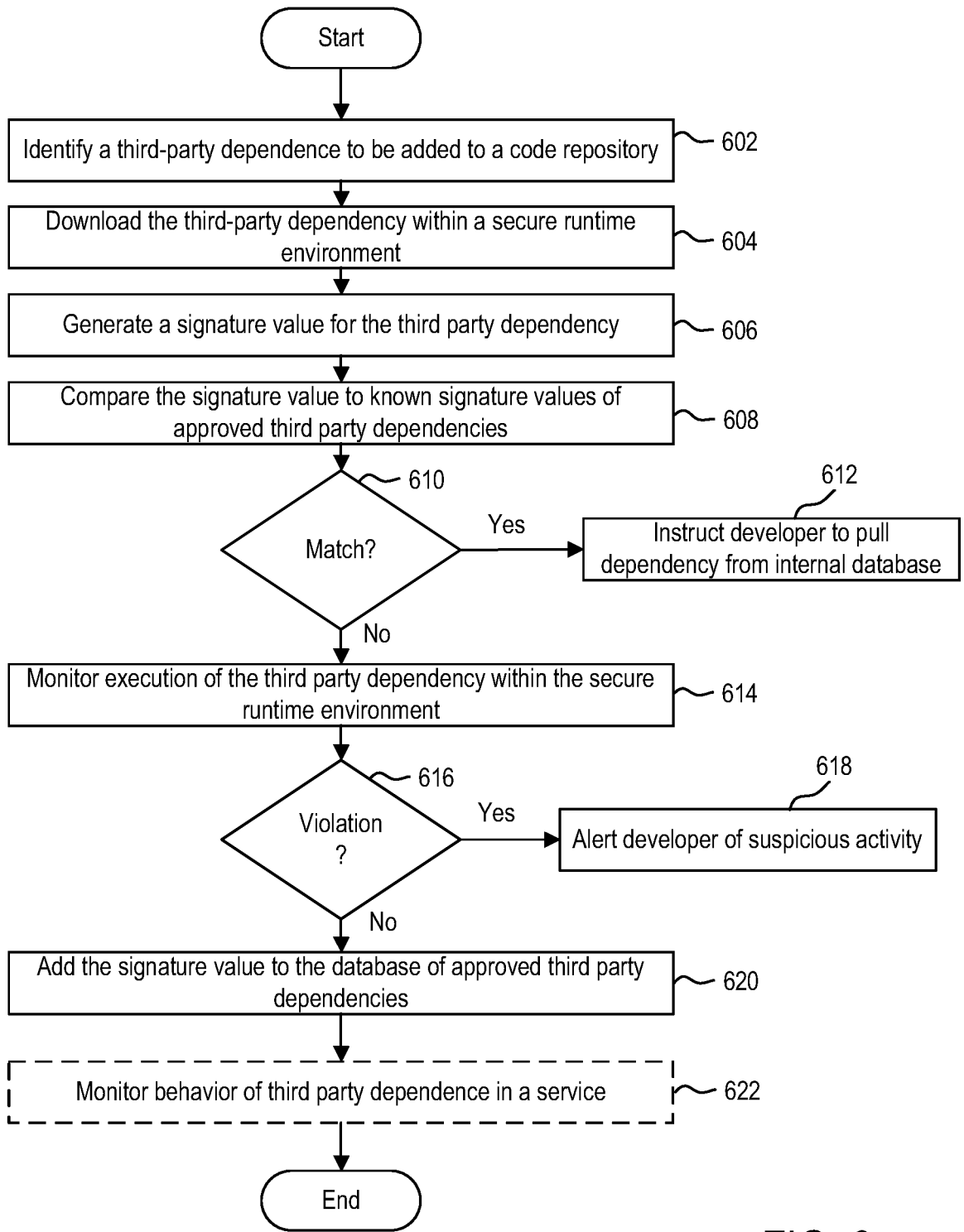
FIG. 6 is a flow diagram illustrating a method of preventing malicious dependencies, according to example embodiments.

FIG. 6 is a flow diagram illustrating a method 600 of preventing malicious dependencies, according to example embodiments. Method 600 may begin at step 602.

At step 602, content management system 204 may identify a third-party dependency to be added to a code repository. In some embodiments, content management system 204 may identify a third-party dependency by receiving an indication from a developer via developer device 202. For example, developer device 202 may access functionality of security server 222a and/or security server 222b via security server portal 214 executing thereon.

At step 604, content management system 204 may download the third-party dependency. For example, security server 222b may download the third-party dependency from a respective third-party repository 206. In some embodiments, downloading the third-party dependency may include security server 222b submitting a hypertext transfer protocol (HTTP) request to third-party repository 206 based on a URL provided by developer device 202.

At step 606, content management system 204 may generate a signature value for the third-party dependency. For example, security agent 230 may generate the signature value for the third-party dependency by hashing the entire third-party dependency. In this manner, security agent 230 may generate a unique signature value for the third-party signature.

At step 608, content management system 204 may compare the signature value to known signature values of approved third-party dependencies. For example, security agent 230 may query code repository 220 to determine whether there is a stored matching hash value. If, for example, the third-party responsible for the third-party dependency updates or changes the third-party dependency in any way, subsequent hashing of that third-party dependency will not yield an identical signature value.

At step 610, content management system 204 may determine if there is a matching signature value in code repository 220. If, for example, at step 610, content management system 204 determines that there is a matching signature in code repository 220, i.e., the query submitted by security agent 230 returns a hit, then method 600 may proceed to step 612. At step 612, content management system 204 may instruct or alert the developer to pull the dependency from code repository 220.

If, however, at step 610, content management system 204 determines that there is not a matching signature value in code repository 220, i.e., the query submitted by security agent 230 does not return a hit, then method 600 may proceed to step 614.

At step 614, content management system 204 may execute the codebase without the third-party dependency in security server 222a; content management system 204 may execute a replica of the codebase with the third party dependency in security server 222b. Following execution, security agent 230 may compare metadata generated by security server 222b to metadata generated by security server 222a to identify whether the third-party dependency exhibits suspicious activity. For example, security agent may analyze the sets of metadata to determine whether the third-party dependency violated any security rules.

A step 616, content management system 204 may determine if the third-party dependency violates a security rule. If, at step 616, security agent 230 determines that the third-party dependency violates a security rule (e.g., security agent 230 identifies anomalies or malicious calls outside of the expected perimeter), then method 600 may proceed to step 618. At step 618, content management system 204 may alert developer device 202 that the third-party dependency is malicious.

If, however, at step 616, security agent 230 determines that the third-party dependency does not violate a security rule (e.g., does not identify any anomalies or malicious calls outside of the expected perimeter), then method 600 may proceed to step 620. At step 620, security agent 230 may add the signature value corresponding to the third-party dependency in code repository 220. In this manner, should developer device 202 or another developer request use of that third-party dependency, security agent 230 may re-hash the dependency and determine that there is a matching signature value in code repository 220.

In some embodiments, method 600 may include step 622. At step 622, content management system 204 may monitor behavior of the third-party dependency as deployed in a service in runtime server 224. For example, deep tracker 242 may monitor the source code for various system calls (e.g., application calls, infrastructure calls, network calls, etc.), authenticity of calls between services, and the like to see if service 240 is exhibiting anomalous activity. Such deep tracking provides a further check on third party dependencies by monitoring the behavior of the third-party dependency once deployed.

Figure 7:
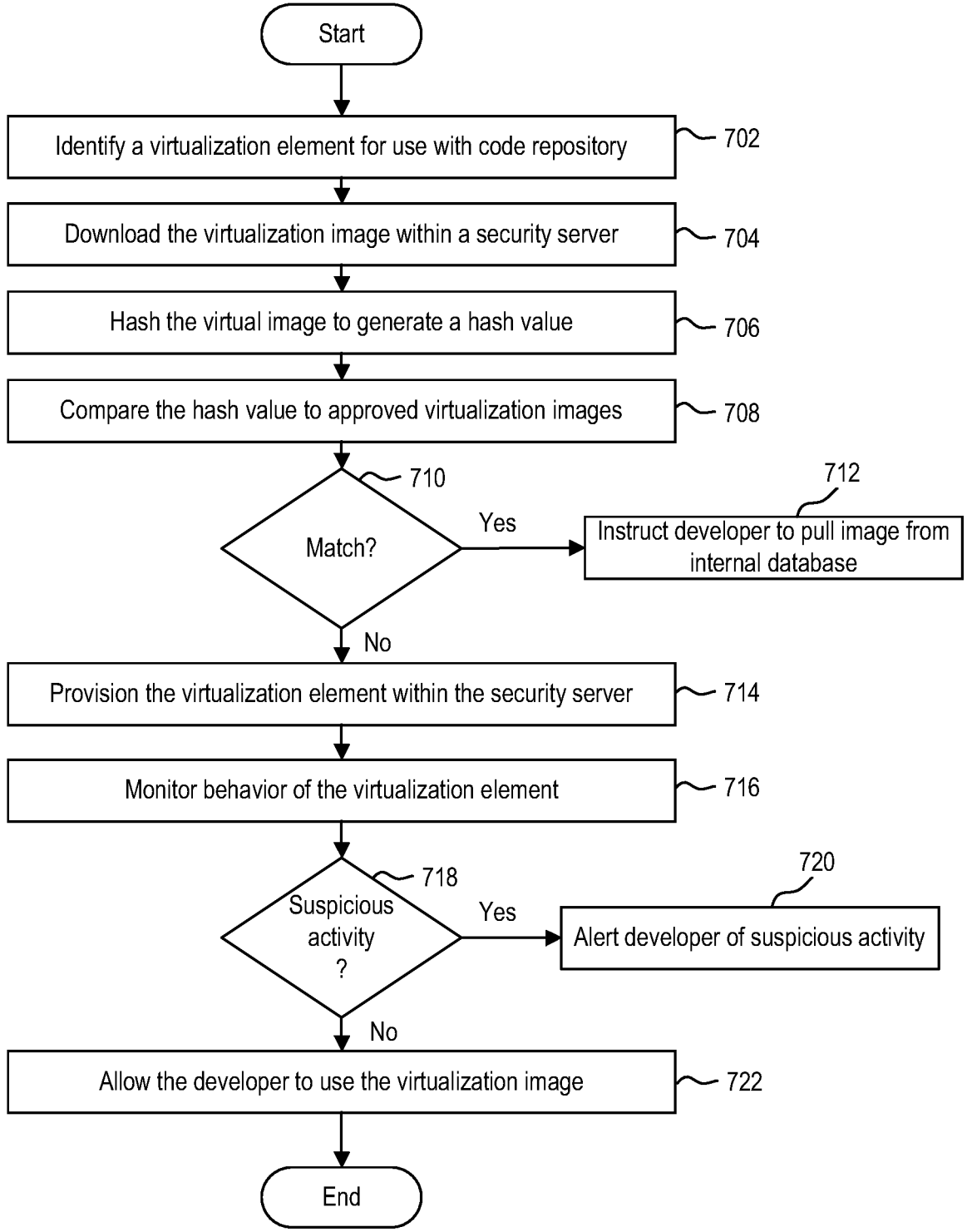
FIG. 7 is a flow diagram illustrating a method of preventing malicious virtualization images, according to example embodiments.

FIG. 7 is a flow diagram illustrating a method 700 of preventing malicious virtualization images, according to example embodiments. Method 700 may begin at step 702.

At step 702, content management system 404 may identify a potential virtualization image to be added to an image repository. In some embodiments, content management system 404 may identify a potential virtualization image by receiving an indication from a developer via developer device 402. For example, developer device 402 may access functionality of security server 422 via security server portal 414 executing thereon.

At step 704, content management system 404 may download the potential virtualization image within secure runtime environment 428. For example, security server 422 may download the potential virtualization image from a respective server or receive the potential virtualization image from developer device 402.

At step 706, content management system 404 may generate a signature value for the potential virtualization image. For example, security agent 430 may generate the signature value for the potential virtualization image by hashing the entire virtualization image. In this manner, security agent 430 may generate a unique signature value for the potential virtualization image.

At step 708, content management system 404 may compare the signature value to known signature values of approved virtualization images. For example, security agent 430 may query image repository 420 to determine whether there is a stored matching hash value. If, for example, the party for the potential virtualization image updates or changes the potential virtualization image in any way, subsequent hashing of the updated or modified virtualization image will not yield an identical signature value.

At step 710, content management system 404 may determine if there is a matching signature value in image repository 420. If, for example, at step 710, content management system 404 determines that there is a matching signature in image repository 420, i.e., the query submitted by security agent 430 returns a hit, then method 700 may proceed to step 712. At step 712, content management system 404 may instruct or alert the developer to pull the virtualization image from image repository 420.

If, however, at step 710, content management system 404 determines that there is not a matching signature value in image repository 420, i.e., the query submitted by security agent 430 does not return a hit, then method 700 may proceed to step 714. At step 714, content management system 404 may provision a virtualization element within secure runtime environment 428 using the potential virtualization image. For example, security agent 430 may utilize virtualization engine 432 to provision a virtualization element using the potential virtualization image.

At step 716, content management system 404 may monitor behavior of the virtualization element within secure runtime environment 428 to identify whether the potential virtualization image may exhibit malicious behavior. For example, security agent 430 may monitor the virtualization element (provisioned using the potential virtualization image) within secure runtime environment 428. Security agent 430 may implement a whitelist that includes a preselected list of allowed actions the virtualization element may take. For example, the whitelist may define those calls (e.g., system calls, application calls, networking calls, etc.) that the virtualization element may take. Security server 422 may generate a set of metadata based on the execution. Security agent 430 may parse the metadata to identify any anomalies or malicious calls that violate the security rules defined in the whitelist.

A step 718, content management system 404 may determine whether the virtualization element exhibits suspicious activity. If, at step 710, security agent 430 determines that the virtualization element exhibits suspicious activity (e.g., security agent 430 identifies anomalies or malicious calls outside of the expected perimeter), then method 700 may proceed to step 720. At step 720, content management system 404 may alert developer device 402 that the potential virtualization image is malicious.

If, however, at step 718, security agent 430 determines that the virtualization element does not exhibit suspicious behavior (e.g., security agent 430 does not identify any anomalies or malicious calls outside of the expected perimeter), then method 700 may proceed to step 722. At step 722, security agent 430 may add the signature value corresponding to the potential virtualization image to image repository 420. In this manner, should developer device 402 or another developer request use of that virtualization image, security agent 430 may re-hash the virtualization image and determine that there is a matching signature value in image repository 420.

Figure 8A:
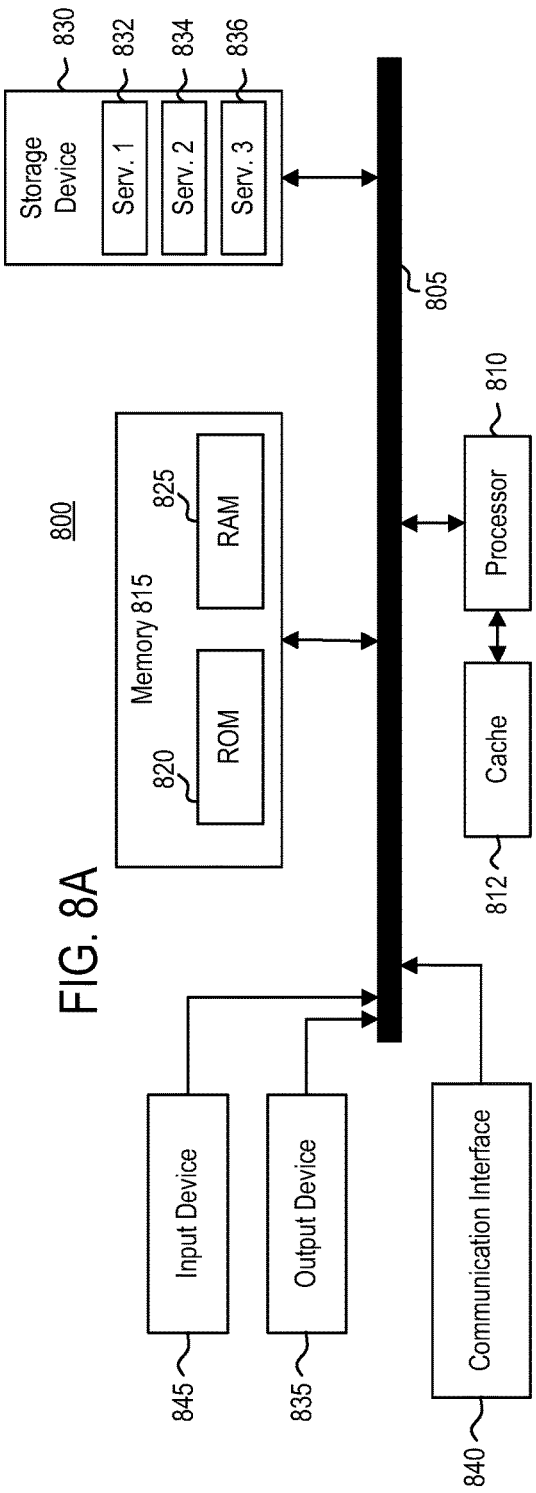
FIG. 8A illustrates an example system configuration for implementing various embodiments of the present technology, according to example embodiments.

FIG. 8A illustrates an architecture of system bus computing system 800, according to example embodiments. One or more components of system 800 may be in electrical communication with each other using a bus 805. System 800 may include a processor (e.g., one or more CPUs, GPUs or other types of processors) 810 and a system bus 805 that couples various system components including the system memory 815, such as read only memory (ROM) 820 and random access memory (RAM) 825, to processor 810. System 800 can include a cache of high-speed memory connected directly with, in close proximity to, or integrated as part of processor 810. System 800 can copy data from memory 815 and/or storage device 830 to cache 812 for quick access by processor 810. In this way, cache 812 may provide a performance boost that avoids processor 810 delays while waiting for data. These and other modules can control or be configured to control processor 810 to perform various actions. Other system memory 815 may be available for use as well. Memory 815 may include multiple different types of memory with different performance characteristics. Processor 810 may be representative of a single processor or multiple processors. Processor 810 can include one or more of a general purpose processor or a hardware module or software module, such as service 1 832, service 2 834, and service 3 836 stored in storage device 830, configured to control processor 810, as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the system 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms (e.g., a display) known to those of skill in the art. In some instances, multimodal systems can enable a user to provide multiple types of input to communicate with system 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 may be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 can include services 832, 834, and 836 for controlling the processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, output device 835, and so forth, to carry out the function.

Figure 8B:
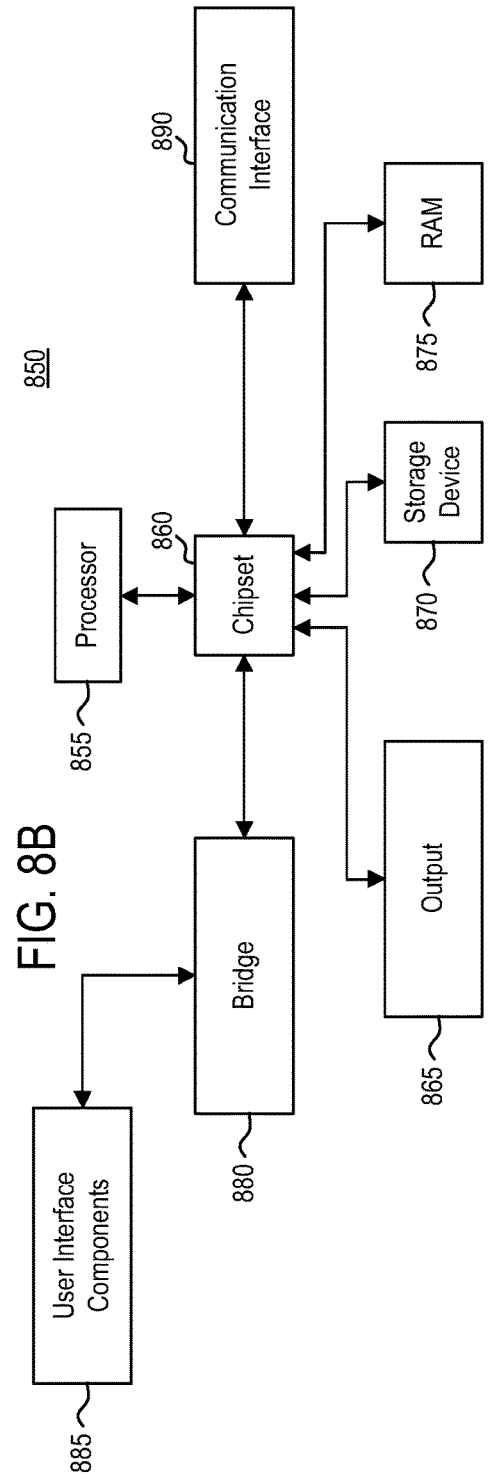
FIG. 8B illustrates an example system configuration for implementing various embodiments of the present technology, according to example embodiments.

FIG. 8B illustrates a computer system 850 having a chipset architecture that can be used in executing the described method and generating and displaying a graphical user interface (GUI). Computer system 850 may be an example of computer hardware, software, and firmware that can be used to implement the disclosed technology. System 850 can include one or more processors 855, representative of any number of physically and/or logically distinct resources capable of executing software, firmware, and hardware configured to perform identified computations. One or more processors 855 can communicate with a chipset 860 that can control input to and output from one or more processors 855. In this example, chipset 860 outputs information to output 865, such as a display, and can read and write information to storage device 870, which can include magnetic media, and solid state media, for example. Chipset 860 can also read data from and write data to storage device 875 (e.g., RAM). A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 855 analyzing data stored in storage device 870 or storage device 875. Further, the machine can receive inputs from a user through user interface components 885 and execute appropriate functions, such as browsing functions by interpreting these inputs using one or more processors 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
    identifying, by a computing system, a third-party dependency to be added to a codebase, the third-party dependency hosted on a third-party server;
    downloading, by the computing system, the third-party dependency within a secure runtime environment;
    generating, by the computing system, a signature value for the third-party dependency;
    comparing, by the computing system, the signature value to a database of signature values of approved third-party dependencies;
    upon determining, by the computing system, that the signature value does not correspond to any signature values of the approved third-party dependencies, executing the third-party dependency with a replica of the codebase within the secure runtime environment;
    monitoring, by the computing system, the execution of the third-party dependency within the secure runtime environment to identify whether the third-party dependency violates a security rule;
    upon determining, by the computing system, that the third-party dependency does not violate the security rule, adding the signature value to the database of signature values of approved third-party dependencies; and
    after the third-party dependency has been determined not to exhibit suspicious activity and has been imported into the codebase:
        executing, by the computing system, a service incorporating the third-party dependency on a runtime server, and
        monitoring, by the computing system, behavior of the third-party dependency as incorporated in the service on the runtime server.

2. The method of claim 1, wherein monitoring, by the computing system, the behavior of the third-party dependency as incorporated in the service comprises:
   utilizing a machine learning model to analyze the behavior of the third-party dependency.

3. The method of claim 1, further comprising:
   allowing a developer to utilize the third-party dependency in the codebase by pulling the third-party dependency from the database of approved third-party dependencies.

4. The method of claim 1, wherein identifying, by the computing system, the third-party dependency to be added to the codebase comprises:
   receiving a uniform resource locator (URL) from a developer device, wherein the uniform resource locator identifies a location of the third-party dependency on a third-party server.

5. The method of claim 4, wherein downloading, by the computing system, the third-party dependency within the secure runtime environment comprises:
   generating a hypertext transfer protocol (HTTP) request to the third-party server based on the URL.

6. The method of claim 1, wherein monitoring, by the computing system, the execution of the third-party dependency within the secure runtime environment to identify suspicious activity comprises:
   monitoring behavior of the third-party dependency to identify any anomalies or malicious calls outside of an expected perimeter.

7. The method of claim 1, further comprising:
   executing, by the computing system, the codebase in a second secure runtime environment.

8. The method of claim 7, wherein monitoring, by the computing system, the execution of the third-party dependency within the secure runtime environment to identify whether the third-party dependency violates the security rule comprises:
   identifying a first set of metadata generated by the secure runtime environment, wherein the first set of metadata comprises a first set of calls made during execution of the third-party dependency with the replica of the codebase;
   identifying a second set of metadata generated by the second secure runtime environment, wherein the second set of metadata comprises a second set of calls made during execution of the codebase without the third-party dependency; and
   comparing the first set of metadata to the second set of metadata to determine whether the third-party dependency triggered a call that violates the security rule.

9. A method comprising:
   identifying, by a computing system, a virtualization element for use with a codebase;
   downloading, by the computing system, a virtualization image corresponding to the virtualization element within a secure runtime environment;
   hashing, by the computing system, the virtualization image to generate a hash value for the virtualization image;
   comparing, by the computing system, the hash value to a database of approved virtualization images;
   upon determining, by the computing system, that the hash value does not correspond to any of the approved virtualization images, provisioning the virtualization element within the secure runtime environment using the virtualization image;
   monitoring, by the computing system, behavior of the virtualization element within the secure runtime environment to identify suspicious activity;
   upon determining, by the computing system, that the virtualization element is not exhibiting suspicious activity, allowing a developer to utilize the virtualization image with the codebase;
   identifying, by the computing system, an updated virtualization image to be added to the codebase, the updated virtualization image corresponding to a new version of the virtualization image;
   downloading, by the computing system, the updated virtualization image within the secure runtime environment;
   generating, by the computing system, a second signature value for the updated virtualization image;
   comparing, by the computing system, the second signature value to the database of signature values of approved virtualization images; and
   upon determining, by the computing system, that the second signature value does not correspond to at least one signature value of the approved virtualization images, provisioning a second virtualization element using the updated virtualization image within the secure runtime environment.

10. The method of claim 9, wherein allowing the developer to utilize the virtualization image in the codebase comprises:
    pulling the virtualization image from the database of approved virtualization images.

11. The method of claim 9, wherein identifying, by the computing system, the virtualization element to be added to the codebase comprises:
    receiving the virtualization element from a developer device via a security server portal executing thereon.

12. The method of claim 9, monitoring, by the computing system, the behavior of the virtualization element within the secure runtime environment to identify suspicious activity comprises:
    monitoring the behavior of the virtualization element to identify any anomalies or malicious calls outside of an expected perimeter.

13. The method of claim 9, further comprising:
    identifying, by the computing system, a second virtualization image to be added to the codebase;
    downloading, by the computing system, the second virtualization image within the secure runtime environment;
    generating, by the computing system, a second signature value for the second virtualization image;
    comparing, by the computing system, the second signature value to the database of signature values of approved virtualization images; and
    upon determining, by the computing system, that the second signature value corresponds to at least one signature value of the approved virtualization images, alerting a developer that the second virtualization image is not malicious.

14. A method comprising:
    identifying, by a computing system, a third-party dependency to be added to a codebase, the third-party dependency hosted on a third-party server, the identifying comprising receiving a uniform resource locator (URL) from a developer device, wherein the uniform resource locator identifies a location of the third-party dependency on a third-party server;

downloading, by the computing system, the third-party dependency within a secure runtime environment;

generating, by the computing system, a signature value for the third-party dependency;

comparing, by the computing system, the signature value to a database of signature values of approved third-party dependencies;

upon determining, by the computing system, that the signature value does not correspond to any signature values of the approved third-party dependencies, executing the third-party dependency with a replica of the codebase within the secure runtime environment;

monitoring, by the computing system, the execution of the third-party dependency within the secure runtime environment to identify whether the third-party dependency violates a security rule; and upon determining, by the computing system, that the third-party dependency does not violate the security rule, adding the signature value to the database of signature values of approved third-party dependencies.

15. The method of claim 14, wherein downloading, by the computing system, the third-party dependency within the secure runtime environment comprises:

generating a hypertext transfer protocol (HTTP) request to the third-party server based on the URL.

16. A method comprising:

identifying, by a computing system, a third-party dependency to be added to a codebase, the third-party dependency hosted on a third-party server;

downloading, by the computing system, the third-party dependency within a secure runtime environment;

generating, by the computing system, a signature value for the third-party dependency;

comparing, by the computing system, the signature value to a database of signature values of approved third-party dependencies;

upon determining, by the computing system, that the signature value does not correspond to any signature values of the approved third-party dependencies, executing the third-party dependency with a replica of the codebase within the secure runtime environment;

executing, by the computing system, the codebase in a second secure runtime environment;

monitoring, by the computing system, the execution of the third-party dependency within the secure runtime environment to identify whether the third-party dependency violates a security rule, the monitoring comprising:

identifying a first set of metadata generated by the secure runtime environment, wherein the first set of metadata comprises a first set of calls made during execution of the third-party dependency with the replica of the codebase;

identifying a second set of metadata generated by the second secure runtime environment, wherein the second set of metadata comprises a second set of calls made during execution of the codebase without the third-party dependency, and comparing the first set of metadata to the second set of metadata to determine whether the third-party dependency triggered a call that violates the security rule; and upon determining, by the computing system, that the third-party dependency does not violate the security rule, adding the signature value to the database of signature values of approved third-party dependencies.

* * * * *